US010339755B2

(12) United States Patent
Snow

(10) Patent No.: US 10,339,755 B2
(45) Date of Patent: Jul. 2, 2019

(54) USING A TABLE AND PROGRESSIVE METER IN SIDE EVENTS

(71) Applicant: Bally Gaming, Inc., Las Vegas, NV (US)

(72) Inventor: Roger M. Snow, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 15/991,207

(22) Filed: May 29, 2018

(65) Prior Publication Data

US 2018/0276937 A1 Sep. 27, 2018

Related U.S. Application Data

(63) Continuation of application No. 11/591,259, filed on Oct. 31, 2006, now abandoned, which is a continuation-in-part of application No. 10/770,613, filed on Feb. 2, 2004, now Pat. No. 7,905,770, and a continuation-in-part of application No. 10/637,380, filed on Aug. 7, 2003, now abandoned.

(51) Int. Cl.
*G06F 17/00* (2019.01)
*G07F 17/32* (2006.01)

(52) U.S. Cl.
CPC ............ *G07F 17/322* (2013.01); *G07F 17/32* (2013.01); *G07F 17/3258* (2013.01)

(58) Field of Classification Search
None
See application file for complete search history.

(56) References Cited

U.S. PATENT DOCUMENTS

| | | | |
|---|---|---|---|
| 4,836,553 | A | 6/1989 | Suttle et al. |
| 4,948,134 | A | 8/1990 | Suttle et al. |
| 5,248,142 | A | 9/1993 | Breeding |
| 5,275,411 | A | 1/1994 | Breeding |
| 5,324,041 | A | 6/1994 | Boylan et al. |
| 5,364,104 | A | 11/1994 | Jones et al. |
| 5,580,061 | A | 12/1996 | Kong |
| 5,584,486 | A | 12/1996 | Franklin |

(Continued)

FOREIGN PATENT DOCUMENTS

| | | |
|---|---|---|
| WO | 2008061001 A2 | 5/2008 |
| WO | 2009061618 A1 | 5/2009 |

OTHER PUBLICATIONS

Las Vegas Poker Promotions, Jumbo Hold'em, Gaming at Station Casinos, "Jumbo Hold'em, Bad Beat Progressive!" <<http://www.stationcasinos.com/gaming/poker/promos/jumboholdem/>> (Nov. 28, 2011), (as accessed Mar. 20, 2012), 2 pages.

(Continued)

*Primary Examiner* — Paul A D'Agostino
(74) *Attorney, Agent, or Firm* — TraskBritt

(57) ABSTRACT

A casino wagering game is played with a progressive jackpot and a second bonus event. At least one player places a wager to play a casino wagering game. The at least one player places a second wager that is optionally varying in amount wagered at the election of the player. The second wager enters both the progressive jackpot event and the second bonus event. The casino retains a portion of the second wager to become part of the progressive jackpot, while the second wager also is required to enter the at least one player in the second bonus event.

19 Claims, 1 Drawing Sheet

(56) References Cited

U.S. PATENT DOCUMENTS 5,597,162 A 1/1997 Franklin
5,653,444 A 8/1997 Dahl
5,851,011 A 12/1998 Lott
5,863,041 A * 1/1999 Boylan ............... A63F 3/00157 273/292
5,931,472 A 8/1999 Ko
5,951,011 A * 9/1999 Potter ................. A63F 3/00157 273/292
5,984,779 A 11/1999 Bridgeman et al.
6,007,424 A 12/1999 Evers et al.
6,012,719 A 1/2000 Webb
6,070,876 A 6/2000 Ko
6,113,103 A 9/2000 Mostashari
6,146,270 A 11/2000 Huard et al.
6,206,373 B1 3/2001 Garrod
6,267,671 B1 7/2001 Hogan
6,270,078 B1 8/2001 Leone et al.
6,299,154 B1 10/2001 Ballestrazzi et al.
6,336,857 B1 1/2002 McBride
6,345,823 B1 2/2002 Webb
6,346,044 B1 * 2/2002 McCrea, Jr. .............. A63F 1/18 273/292
6,386,973 B1 * 5/2002 Yoseloff .............. A63F 3/00157 273/274
6,422,564 B1 7/2002 Baranauskas
6,435,511 B1 8/2002 Vancura et al.
6,446,972 B1 9/2002 Brunelle
6,481,719 B2 11/2002 Webb
6,485,368 B2 11/2002 Jones et al.
6,491,302 B1 12/2002 Boylan et al.
6,568,682 B1 5/2003 Hogan et al.
6,609,711 B1 8/2003 Campbell
6,634,946 B1 10/2003 Bridgeman et al.
6,659,461 B2 12/2003 Yoseloff et al.
6,698,758 B2 3/2004 Hodge
6,698,759 B2 3/2004 Webb et al.
6,702,289 B1 3/2004 Feola
6,719,291 B1 4/2004 deKeller
6,729,620 B2 5/2004 Jones
6,776,415 B2 8/2004 Robinson et al.
6,789,800 B2 9/2004 Webb
6,793,220 B1 9/2004 Feola
6,802,510 B1 10/2004 Haber
6,805,353 B2 10/2004 Williams
6,837,494 B2 * 1/2005 Lee ..................... A63F 3/00157 273/274
6,896,265 B1 5/2005 Schlumbrecht
7,169,041 B2 * 1/2007 Tessmer .................. G07F 17/32 463/16
7,195,243 B2 3/2007 Kenny et al.
8,371,918 B2 2/2013 Snow
2001/0024969 A1 * 9/2001 Jones .................. A63F 3/00157 463/13
2002/0025845 A1 2/2002 Cannon
2002/0153662 A1 10/2002 Webb et al.
2003/0087684 A1 * 5/2003 Webb ...................... G07F 17/32 463/13
2003/0114219 A1 * 6/2003 McClintic ............... G07F 17/32 463/25
2003/0155713 A1 8/2003 Jones et al.
2003/0228899 A1 * 12/2003 Evans ..................... G07F 17/32 463/25
2004/0023712 A1 * 2/2004 Oliver ..................... G07F 17/32 463/18
2004/0038720 A1 2/2004 Valente
2004/0063485 A1 4/2004 Webb
2004/0082373 A1 * 4/2004 Cole ................... G07F 17/3223 463/13
2004/0176155 A1 * 9/2004 Gold ....................... G07F 17/32 463/13
2004/0204243 A1 * 10/2004 de Mello Costa ...... G07F 17/32 463/42
2005/0032563 A1 * 2/2005 Sines .................. A63F 3/00157 463/13
2005/0164762 A1 7/2005 Smith et al.
2005/0170875 A1 8/2005 Snow
2005/0269783 A1 12/2005 Snow
2006/0058087 A1 3/2006 White et al.
2006/0084505 A1 4/2006 Yoseloff et al.
2006/0287103 A1 12/2006 Crawford, III et al.
2006/0290059 A1 12/2006 Scott et al.
2007/0054733 A1 3/2007 Baerlocher
2007/0060240 A1 3/2007 White
2008/0007003 A1 1/2008 Davis et al.
2009/0005144 A1 1/2009 Moody
2009/0181742 A1 7/2009 Jackson
2009/0227364 A1 9/2009 Kelly et al.
2010/0016050 A1 1/2010 Snow et al.
2012/0280454 A1 11/2012 Snow
2013/0053117 A1 2/2013 Snow
2013/0157752 A1 6/2013 Yoseloff
2013/0184079 A1 7/2013 Costello et al.

OTHER PUBLICATIONS

PCT International Search Report and Written Opinion of the International Searching Authority for PCT/US2013/038688, (dated Oct. 10, 2013), 9 pages.

* cited by examiner

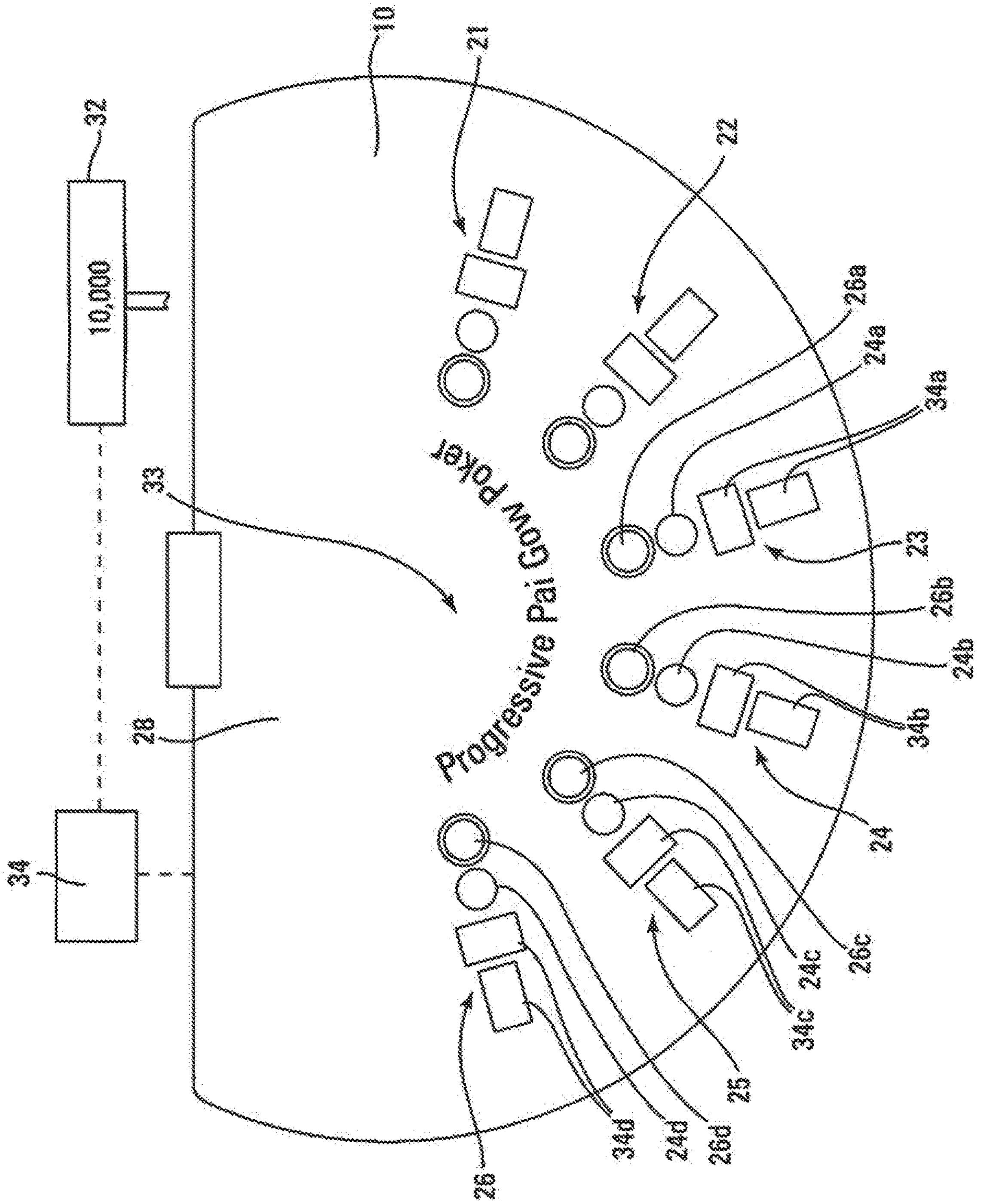
10
21
22
32
10,000
33
Progressive Pai Gow Poker
28
34
26a
24a
34a
23
26b
24b
34b
24
26c
24c
34c
25
34d
24d
26d
26

USING A TABLE AND PROGRESSIVE METER IN SIDE EVENTS

CROSS-REFERENCE TO RELATED APPLICATIONS

This application is a continuation of U.S. patent application Ser. No. 11/591,259, filed Oct. 31, 2006 (now abandoned), which is a continuation-in-part of each of U.S. patent application Ser. No. 10/770,613, filed Feb. 2, 2004 (now U.S. Pat. No. 7,905,770, issued Mar. 15, 2011) and U.S. patent application Ser. No. 10/637,380, filed Aug. 7, 2003 (now abandoned).

TECHNICAL FIELD

The present invention relates to games of chance, particularly card games of chance, more particularly bonus games in casino table card games. The technology herein has particular application to games with progressive jackpot bets, wherein portions of the progressive wager contribute to the jackpot value. The invention has a highly desirable embodiment for use with the game of Pai Gow poker, as well as with any game that has a progressive jackpot feature in combination with other jackpot or bonus features entered through a side wager. An example of the present invention is an improved version of the game of Pai Gow poker that is intended to make the game more interesting and to increase revenues for casinos. The game includes a bonus event with a side wager.

BACKGROUND

One significantly attractive feature in gaming is the opportunity to win a large amount of money or value without wagering a large amount in each play of a game. The development of the progressive jackpot based on contributory wagers has become an important attraction in most aspects of gaming. One of the most successful video or slot games has been the WHEEL OF FORTUNE® slot game, in which a small portion of each underlying wager is added to a progressively increasing jackpot. To enable contributions from the single wager, the payout frequency and payout amounts from the underlying game are reduced.

CARIBBEAN STUD® poker invigorated variant poker games by emphasizing a fixed side wager on a progressive jackpot. A portion of the side wager is put into a progressive jackpot, and payments are made for particularly high-ranking hands. All payments on such hands are specifically withdrawn from a monitored jackpot fund, and all contribution to the jackpot is made from a portion of the side wager, after an initial staking of the jackpot with seed money. All other payments on bonus level hands come out of the underlying ante and play wagers, while retaining profits for the casino. The success of these games has stimulated attempts at other progressive and side wagers.

U.S. Pat. No. 5,863,041 (Boylan et al.) describes a method of playing a Pai Gow poker wagering game, in which an ante wager is initially wagered and a bonus wager is also wagered by at least one player. Seven cards are then dealt to each player and to the dealer and arranged into a two-card low hand and a five-card high hand. The ante wager of each player is then paid off in the usual manner for Pai Gow poker. Thereafter, a best five-out-of-seven card poker hand is arranged by the dealer, for each player, from the seven cards initially dealt to the player, and the bonus wager is paid off if the best poker hand has a poker rank equal to or better than a first predetermined rank (e.g., a straight) but less than a second predetermined rank (e.g., a royal flush or five-of-a-kind in a wild card game).

Next, the dealer determines whether the best poker hand of each player has a poker rank better than or equal to the second predetermined rank, and an auxiliary game of chance, such as rolling three dice, is then played to determine whether the bonus wager is paid off at a first payoff rate, when the player is a loser in the auxiliary game, or at a second payoff higher than the first payoff rate, when the player is a winner in the auxiliary game. In addition, the dealer then determines whether each player has made a bonus wager of a predetermined minimum amount (exceeding the betting minimum), which is then paid off to other players if any other player has a best poker hand equal to or better than a third predetermined rank (four-of-a-kind) in an event called an "envy" event. The preferred method of play, described in Boylan et al., includes three separate potential payouts to each player making appropriate wagers as follows: 1) a payout on a standard Pai Gow player-versus-dealer wager; 2) a bonus payout on a bonus wager for a poker hand; and 3) an "envy" payout. Boylan et al. therefore discloses a three-tier payout Pai Gow game in which there are two distinct wagers. Those two wagers are a Pai Gow wager and the bonus wager. When the bonus wager is of sufficient size (more than a minimum payment), the bonus wager enables both best five-card poker hand bonuses and a "bad beat" bonus, each bonus event having different minimum ranks, although those ranks overlap.

U.S. Pat. No. 6,007,424 (Evers et al.) describes a method, device, and system for playing a new game of Pai Gow poker. For a push, the player's high hand must have a higher ranking than the dealer's high hand and be jacks or better. All other hands are losses. The method provides for greater payoffs if the player has one of a plurality of payoff qualifying holdings. The device includes a processor programmed to play the game according to the method. The system provides for linking devices to amass a progressive jackpot, should the player obtain a qualifying holding. At least one pre-determined holding of the player's high hand is designated as a qualifying "bad beat" combination. If the player obtains the bad beat combination and loses the hand, the player is paid an amount according to a payout schedule.

U.S. Pat. No. 5,931,472 (Ko) describes an improved game of Pai Gow, which improved game includes offering the player an optional bonus wager. Should the tiles of the player's hand match any predetermined bonus outcome tile combination, the player receives a reward for his or her bonus wager, regardless of whether or not the player has won his or her hand according to the rules of Pai Gow.

U.S. Pat. No. 6,070,876 (Ko) describes an improved game of Pai Gow, which improved game includes offering the player an optional bonus wager. Should the tiles of the player's hand match any predetermined bonus outcome tile combination, the player receives a reward for his or her bonus wager, regardless of whether or not the player has won his or her hand according to the rules of Pai Gow. The game also provides the option to make a tie wager.

U.S. Pat. No. 6,113,103 (Mostashari) teaches a variation of Pai Gow poker known as Dragon Poker. A player posts a wager and is dealt a first four of seven cards face down. A bank is dealt a first four of seven cards, three of which are dealt face up. The player is then given an option of surrendering and receiving a return of a portion of the wager. With the surrender, the player's participation in the game is at an end. The player who does not surrender is a "surviving" player to whom may be given an option of increasing the wager. The surviving player and the bank are each dealt three additional cards to enable formation of a player back hand and a player front hand and formation of a bank back hand and a bank front hand. After the hands are formed, the wager is resolved.

U.S. Pat. No. 5,584,486 (Franklin) describes a method of playing a game of Pai Gow poker comprising a player placing a first wager; a player placing a jackpot bet; and a dealer dealing seven cards to himself and to said player. Each player arranges his/her cards into a low hand, including two of the seven cards, and a high hand, including five of the seven cards. Each player evaluates the cards and determines whether the cards comprise a predetermined jackpot holding of a low hand pair and a high hand of one of (i) four aces and the joker, (ii) a royal flush, (iii) a straight flush, (iv) a four-of-a-kind, (v) a full house, (vi) a flush, or (vii) a straight. Players are paid a jackpot amount if the player has a jackpot holding. The winner of the first wager is determined by comparing a low hand of the dealer to the low hand of the player and comparing a high hand of the dealer to the high hand of the player.

U.S. Patent Publication No. 2006/0084505 (Yoseloff et al.) describes a multi-player platform that provides multiple player positions for live players to engage in an interactive wagering game with a virtual dealer and virtual cards. The multi-player platform comprises at least two player positions that enable live players to place wagers on the game. The game comprises the following steps: placing a wager on a Pai Gow game using Pai Gow hands of seven cards; providing the player in the Pai Gow game with the opportunity to place a side wager, wherein the outcome of the side wager depends on achieving at least a predetermined minimum poker hand rank using the player's seven cards in the Pai Gow hand; providing cards to the player and the dealer to form the player's Pai Gow hand and the dealer's Pai Gow hand, respectively; resolving the Pai Gow game according to the rules of Pai Gow poker; determining the highest ranking poker hand possible using the cards in the player's Pai Gow hand, if the player placed the side wager; comparing the highest ranking poker hand with the predetermined minimum poker hand rank, if the player placed the side wager; and providing an award to the player, if the highest ranking poker hand is of equal or greater rank than the predetermined minimum poker hand rank.

U.S. Patent Publication No. 2005/0269783 (Snow) describes a method of playing a casino table wagering game with at least two players. The method comprises wagering on an underlying game, wherein players may receive a bonus for obtaining a player hand of at least a predetermined rank; placing a side wager that at least one player of the at least two players will obtain a player hand of at least a predetermined rank; playing a hand of the casino table wagering game to conclusion; determining whether at least one of the at least two players has obtained a player hand of the at least a predetermined rank; and, if a player has not obtained a player hand of at least a predetermined rank but that player has placed the side wager that at least one player of the at least two players will obtain a player hand of at least a predetermined rank, and if another player has obtained a player hand of at least a predetermined rank, awarding that player a predetermined proportional share of the bonus for obtaining a player hand of at least a predetermined rank.

U.S. Patent Publication No. 2005/0170875 (Snow) describes a method of playing a Pai Gow poker wagering card game. The method includes the following steps: a) a player placing a wager on a Pai Gow poker game; b) players placing a second wager against a pay table on a separate poker-type game that uses each player's best five-card hand; c) dealing seven-card hands from a set of cards to six player positions and to one dealer position; d) resolving the Pai Gow game and awarding bonuses to players making the second wager and having a best five-card hand that exceeds a predetermined rank; and e) awarding an additional bonus to players with hands that exceed the predetermined rank, if the dealer's best five-card hand is equal to or less than a predetermined rank. An optional envy hand event may be included with the second wager or a special qualifying second or third wager.

Another known modification of the Pai Gow poker game has been played at "Harvey's Resort and Casino" in Tahoe, Nev. In this modified game, a bonus wager is made (in addition to the ante wager in the usual game for the five-card hand rank and the two-card hand rank to be compared with those of the dealer). This bonus wager is won at odds if the player has any five cards (best five-card poker hand of the seven cards dealt) that together rank above a straight (with the odds increasing for increasingly ranked hands). In addition, if a player makes a bonus wager above $5 (5 times the minimum), that player can additionally win a predetermined payoff if any other player has any best five-card hand that forms a poker rank above a four-of-a-kind (with the payoff increasing for increasingly ranked hands). This type of payout is referred to in the industry as an "envy bonus." Envy bonuses are typically won on another player's hand, not on one's own hand.

Although Pai Gow poker has achieved a level of success, such that it is present in most card rooms, it is desirable to provide additional features to the game that can make it even more attractive and successful.

BRIEF SUMMARY

The underlying technology of the present disclosure is the combination of two enabled events from a single wager, wherein one of the events is a progressive jackpot event that receives funding from the single wager and the other event may be a non-progressive bonus event that is enabled by the placement of the same single wager. Exemplary and non-limiting concepts within this technology include at least combinations of wagering events, such as a progressive jackpot and one or more of the following: a bonus odds payout award, an envy wager award, a fixed bonus payout, a bad beat award, a non-monetary prize with a monetary value, and the like.

The underlying game may be any casino wagering event, such as a casino table card game, a slot device game, a video wagering device game, a card game, a roulette game, a dice game, and the like. Additionally, because the size of the event wager, under some circumstances, can cause an increase in player payback, the size of the event wager selected by a player may vary from a minimum amount to a maximum amount, the range of variation predetermined by the casino or administrator.

BRIEF DESCRIPTION OF THE DRAWING

FIG. 1 is a top plan view of a playing surface of an example of game play of the present invention.

DETAILED DESCRIPTION

In the play of any casino wagering system or game, where there is the desire to include a progressive jackpot event with a contributing wager, the jackpot contributing wager (e.g., referred to herein generically as an "event wager," to distinguish it from the ordinary underlying game wager) includes enablement of at least one separate bonus event because of the jackpot contributing wager. An amount or portion of the event wager is contributed to the increasing of a progressive jackpot, a portion funds a separate payout (fixed or odds payouts), and the remainder of the event wager is retained by the house as part of the house economic advantage in the game. This new technology described herein differs from known progressive wagers that have been treated as distinct and separate wagers in which placement of the progressive wager has a portion of the progressive wager added to the increasing progressive jackpot amount and the remainder is retained by the house, without influencing any other game events.

To appreciate the significant impact and technical distinction of this invention, the economic operation of wagers and casino profits on games have to be examined. In the development of games and wagers on games, the wagers allowed and the returns on winning wagers have to be designed so that there is a built-in house profit margin on average for each wager placed in a game. In limited instances, wagers with no house advantage are allowed. For instance, pot bets offer no house edge. In craps, the back-up odds wager provides about the only even money wager in a casino. That wager must be made after placement of the "come" wager, and the combination of the two wagers provides the house with an average return of about 0.18% on the average total wager. This is still the best wager in the casino for the player.

Other games and wagers in casinos have average house retention rates of about 1%, 5%, 10%, 20%, and more on the average wager placed. Players are enticed to make these (on an accounting basis) higher household wagers because of the enjoyment of the game or the potential for extraordinarily large payouts on a relatively small wager. This is exactly one basis of enticement to play in the progressive jackpot events associated with certain casino games or machines. For example, in the play of five-card stud-type poker games, a typical progressive wager of exactly $1.00 (or one wagering unit, as in Europe, 1 Eurodollar) is wagered. Of that dollar, anywhere from 40% to 60% of the one unit wager is typically added to the progressive jackpot. Thus, without considering the relatively small seeding contribution of the casino, the house retains approximately 40% to 60% (respectively) of these wagers, even though the jackpot must be eventually won. A significant problem for the casino for this type of wager, even though it is quite rewarding, is that the wager is always one unit. There is absolutely no incentive for a player to place a larger Progressive Jackpot wager, even if that were possible (most systems allow for only a single unit wager), as the amount of the jackpot event payout does not alter with any change in the amount of the jackpot wager. The casino therefore earns a significant percentage on the jackpot wager, but the total retention by the house is minimized because the wager is relatively small (e.g., $1.00) compared to the ordinary wagers that may be placed in the underlying game (e.g., $5.00 minimum to $1,000.00 maximum). It is therefore desirable to find a way to increase the amount of and frequency of participation in progressive jackpot wagering events.

The underlying technology of the present disclosure is the combination of at least two enabled events from a single wager, wherein one of the events is a progressive jackpot event that receives funding from the single wager and the other event may be a non-progressive bonus event that is enabled by the placement of the single wager. Exemplary and non-limiting concepts within this technology include at least combinations of wagering events, such as a progressive jackpot prize in combination with one or more of the following: a bonus odds payout award, an envy bonus award, a fixed bonus payout, a bad beat payout, a non-monetary prize with a monetary value, and the like.

The underlying game may be any casino wagering event, such as a casino table card game, a slot device, a video wagering device, a roulette game, a dice game, an interactive multi-player gaming machine game, and the like. In the play of slot or video machine systems, a selection button or automatic inclusion in the event wager may be provided. In table games, specific wagering positions may be provided on the table, including wagering positions that provide a signal (e.g., light or electronic signal) indicating the presence of a wager on that position. The use of RFID technology, proximity sensors, capacitive sensors, optical sensors, or any other bet position sensors may also be used to determine not only the presence of the event wager and the specific player making that wager, but also the time when that wager is placed, so that late entry into such a wager may be prevented.

Additionally, because betting more on the event wager can potentially cause an increase in player payback, the size of the event wager selected by a player may vary from a minimum amount to a maximum amount, the range of variation predetermined by the casino or administrator. It is important to note that some wagers are paid back specifically in proportion to the size of the initial wager, as opposed to having a fixed jackpot. This proportional payback is usually defined in a pay table. The pay table lists the various bonus odds payouts for each winning hand. Typically, hands that have the lowest probability of occurrence pay the highest odds. For example, in typical five-card poker pay tables, the return on a wager for specific ranked hands might be, by way of a non-limiting example, defined as follows:

| HAND | PAYOUT ODDS |
|---|---|
| Royal Flush | 1000:1 |
| Straight Flush | 500:1 |
| Four-of-a-kind | 250:1 |
| Full House | 12:1 |
| Flush | 8:1 |
| Straight | 6:1 |
| Three-of-a-kind | 3:1 |
| Two Pair | 2:1 |
| Pair | 1:1 |

These types of payout odds may also be present in the event wager. The event wager may pay back different odds and, therefore, influence players to make higher wagers. Such a payout scheme is also believed to attract more players. For example, in a poker game, with the above pay table retained in the underlying game, the pay table for the added event wager might add any of the following pay tables or alternative pay tables:

TABLE 1

| HAND | PAYOUT ODDS |
|---|---|
| Royal Flush | 2000:1 |
| Straight Flush | 1500:1 |
| Four-of-a-kind | 500:1 |
| Full House | 25:1 |

By eliminating some of the lower payouts and increasing the higher payouts on the highest hands, the payback and house retention are balanced.

TABLE 2

| HAND | PAYOUT ODDS |
|---|---|
| Royal Flush | 500:1 |
| Straight Flush | 150:1 |
| Four-of-a-kind | 100:1 |
| Full House | 12:1 |
| Flush | 10:1 |
| Straight | 8:1 |
| Three-of-a-kind | 4:1 |

Here, the pay tables have been constricted on both high and low ranking hands to make more commonly occurring hands pay better. A pay table with higher mid-range payouts attracts higher wagers, which still retain a significant house return on the event wager.

The percentage of the contribution to the jackpot event from each event wager is also under the control of the casino and/or the administrator. The range may be small to large, and it may vary over the life of the jackpot event. For example, a general contribution range might be, at any time during the play of the jackpot event, from 1% to 99% of the event wager. It is more likely that the contribution to the jackpot event would lie within the ranges of 5% to 95%, 10% to 80%, 10% to 70%, 10% to 60%, 10% to 50%, 20% to 80%, 15% to 75%, 15% to 60%, 15% to 50%, 15% to 40%, 20% to 40%, and the like. The contributions may be higher at the opening of the jackpot event (e.g., 50%), to more rapidly increase the initial size of the jackpot (which may be seeded by the casino or administrator with an amount such as $1,000, $5,000, $10,000, $20,000, or more), and then, as the jackpot reaches a higher level, the amount of contribution may be increased or decreased to either attract more interest or increase the house retention on the wager (e.g., by changing the 50% contribution to 20% or 65%).

Alternatively, a fixed contribution amount (such as $1.00, for a $5.00 minimum wager, for example) of the minimum allowable wager is used as an alternative contribution scheme for funding a jackpot.

One preferred form of the invention allows the player to place a wager between a minimum and a maximum. The fixed contribution amount guarantees that the progressive jackpot is funded, and the house maintains an edge on the wager.

The wager event of the present technology is clearly intended and enabled for use in a generic range of wagering events in a casino, on the internet, on wagering systems, in inter-casino and intra casino gaming events, in televised wagering game shows, including combining the jackpot event among different games and events. The description emphasized below will discuss the use of the wager event with Pai Gow poker as a way of simplifying the discussion rather that detailing its application according to the rules of the many and varied games available within casinos and other gaming environments.

In connecting differing games, differing casinos, or differing media (e.g., a live casino and an internet wagering connection), different percentages of the event wager may be apportioned among the progressive jackpot and the other game events. For example, the probability of a highest-level jackpot event in the play of LET IT RIDE® stud poker may be significantly lower than the probability for the highest-level jackpot event in a progressive blackjack jackpot event (e.g., five consecutive blackjack hands to a single player). To assure that each game is contributing to the jackpot increase in a "fair" apportionment, the blackjack game may contribute a higher proportion of the event wager (e.g., 60%), percent of a minimum allowed wager, or fixed amount to the jackpot than does the LET IT RIDE® stud poker side wager (e.g., 20%). The different events, or even different locations (attempting to influence the location of initial wagers) may be the same or different as the choice of the game administrator.

The amount of the contribution to the progressive jackpot in any game may be controlled by the administrator on the basis of the desired rate of growth of the jackpot, the amount of house retention on wagers desired, and the amount of increase in bonus, fixed payouts, envy, and/or bad beat payouts from the included wager, each and every one of which events influences the amount retained by the house from each wager in the event wager made by a player.

A preferred side wager bonus event is disclosed in U.S. Patent Publication Nos. 2005/0269783 (Snow) (now U.S. Pat. No. 7,537,456, issued May 26, 2009) and 2005/0170875 (Snow) (now U.S. Pat. No. 7,905,770, issued Mar. 15, 2011), and are referred to as FORTUNE PAI GOW™ games. The content of the two referenced published applications are incorporated by reference in their entireties. All other variants of bonus events useful in casino games, whether or not used in Pai Gow poker, may also be combined with or into the wager event of the present technology. That event includes a side wager and corresponding bonus event of the present invention, combined with the traditional game of Pai Gow poker. The bonus event does not in any way alter the strategy of play of the game. The bonus event requires no additional cards and adds interest to the game.

Each player may make a first side wager, to enter the bonus game, and may place a second side wager or a larger first side wager to enter an "envy hand" game event. The bonus game may be played and resolved before play of the Pai Gow game or after play of the Pai Gow game, but is preferably done after the play of the underlying Pai Gow game. The first side wager is made against a pay table, rather than against direct competitive rank play against other players and/or the house. The wager is made on whether the player's hand will exceed a minimum rank and will be paid according to the relative level of the rank achieved in a five card, best-of-seven cards poker hand. The players place the bonus wager or side wager in a designated area. After the basic game of Pai Gow is resolved, the dealer forms a best-of-seven cards five-card hand for each player, and payouts are made on the basis of those five-card hands having at least a minimum poker rank. After the five-card ranks are identified (and possibly after being paid), the dealer's hand is reviewed with respect to the highest possible five-card hand in the dealer's seven cards. If the dealer's best-of-seven five-card hand rank is less than a predetermined rank, e.g., an ace-high Pai Gow (no hand of at least a rank of a pair), players having made the first side wager will not have any bonus payout for a ranked hand multiplied or otherwise increased. If a second side wager has been made or if a required minimum threshold amount for the first side wager has been made, then an envy event will be played. In an envy event, for players making the qualifying envy wager, the appearance in any player's hand of a five-card hand of at least a second predetermined rank will provide a basis for a special bonus to envy event players, except for the player who obtains the five-card hand of the at least second predetermined rank.

Among some of the features that can contribute to the unique play of preferred bonus games of the present technology include one or more of at least the following basic game play elements.

1) The underlying game is a table version of Pai Gow poker game.
2) A mandatory ante wager is placed to play in an underlying Pai Gow poker game against the dealer's hands.
3) An optional or mandatory first side bet is placed at any time prior to the players viewing one or more cards to engage in a separately paying, side wager game against a pay table. The game is usually played with a standard deck without any jokers or a fifty-three-card, standard playing card deck with a single joker, as in the conventional Pai Gow game. Winnings are determined in the first side wager separate game by resolution of best-of-seven five-card poker hands of each player making the first side wager against a five-card poker ranking of hands in a pay table.
4) The separately paying game on this first side wager does not interfere with any underlying strategy in the play of the underlying Pai Gow game.
5) Before, after, or during play of the game against the pay table, a best-of-seven five-card hand is established for the dealer.
6) The separate first side wager game is preferably played out after resolution of the underlying Pai Gow poker game. When the dealer's best-of-seven five-card poker hand has a low rank beneath or at a predetermined threshold (i.e., the dealer does not qualify), awards provided by the pay table on the first side wager game are increased, as by additive amounts, preferably a multiplier effect, or a combination of additive amount and/or multiplier effect.

The Pai Gow game is played to its normal conclusion, the separate game on the first side wager having no possible influence on the Pai Gow game. The first side wager game against the pay table is played out (including the dealer hand evaluation bonus event), and, when at least one player has made a qualifying or additional wager in an envy event, envy wagers are resolved.

The bonus event of the present invention may be played in connection with the above described Pai Gow game with first side wager.

The present game may be more generally described as follows. An underlying game of Pai Gow is played (with the side wagers not being considered in this underlying game). That underlying game of Pai Gow is generally played in a manner similar to the following steps.

Ante wagers are made by each player in the underlying Pai Gow game. The wagers are made between a group of respective players against a dealer. The outcome of the game is determined by randomly ordered playing cards having various ranks and suits. Seven cards are dealt to each player and to the dealer. The seven cards dealt to each player are arranged or "set" by that player into a two-card low hand and a five-card high hand (and the player may, in some instances, actually seek advice from the dealer in arranging legally proper hands). The seven cards dealt to the dealer are set by the dealer into a two-card low hand and a five-card high hand, usually according to house rules as to how hands must be arranged. The respective five-card hands and two-card hands of each player and the dealer are compared. The ante wager of each player is paid off according to the rules of play of Pai Gow poker. A payout is made to the respective player if both the two-card hand and the five-card hand of the player have a higher poker rank than the respective two-card hand and five-card hand of the dealer. The wager is taken by the house if both the two-card hand and the five-card hand of the player have a lower poker rank than the respective two-card hand and five-card hand of the dealer. Wagers are a push when only one of the two-card hand and five-card hand of the player has a higher poker rank than the respective two-card hand and five-card hand of the dealer. This is the basic manner in which the underlying game of Pai Gow is played. Other considerations in this play include the fact that the house will require a payment from each player that wins in the underlying game, with the house rake or commission typically based upon the size of the wager made by the player in the underlying game.

In the modified Pai Gow poker game of the present invention, there are additional, but simple steps that are performed. At the beginning of the underlying Pai Gow poker game, the players have an optional or mandatory bonus event side wager that is or can be made. The amount of the bonus event side wager may be independent of the underlying wager in the Pai Gow poker game. For example, the side wager may require a minimum of a $1.00 wager, whether in a $5.00, $10.00, or $25.00 minimum bet Pai Gow poker game. The amount of this minimum wager may be varied according to the design of the game, the target house hold, and variations in the game that may be made by the house. In other forms of the invention, the minimum bet on the bonus event and the underlying game are equal.

Considering only a bonus event with odds payouts at this time, the modified Pai Gow poker game of the invention would proceed as follows. After the play of the underlying Pai Gow poker game and the resolution of the game wagers, the players (alone or with the assistance of the dealer) would then examine their seven cards and create a best five-card poker hand. This best five-card poker hand might actually be different from the five-card hand played during the Pai Gow poker game, because of strategy considerations. For example, it is a common strategy to split a full house in Pai Gow poker to form a three-of-a-kind high hand and a pair for the low hand to increase the likelihood of a win. If the best five-card hand exceeds a minimum rank (e.g., at least a straight), the player holding that five-card hand that at least exceeds the minimum rank is entitled to a bonus payout against a pay table. This bonus payout is in addition to the win in the underlying Pai Gow poker game. An example of a pay table for the bonus win on the side wager could be as follows:

| HAND | PAYOUT ODDS |
| --- | --- |
| Royal Flush | 100:1 |
| Straight Flush | 25:1 |
| Four-of-a-Kind | 10:1 |
| Full House | 3:1 |
| Flush | 2:1 |
| Three-of-a-Kind | 2:1 |
| Straight | 1:1. |

At this time (that is, after the players have organized their best five-card poker hands and compared them to the pay table) or earlier in the play of the game, but after resolution of the underlying Pai Gow poker wager, the dealer arranges the dealer's seven cards into a best five-card poker hand. Where the best five-card poker hand falls at or under a threshold of a rank hand, that is has a rank equal to or less than a predetermined rank, a further bonus consideration is made in the side wager game.

A "Pai Gow" hand, for purposes of this disclosure, is defined as a hand in which no pairs (or higher) can be made from all seven cards in the hand. If the threshold for this additional bonus consideration is set at the Pai Gow hand level (as opposed to a pair of deuces or lower, a pair of threes or lower, a pair of fours or lower, or a king-high Pai Gow (i.e., there are no pairs or higher available and the highest card in the dealer's hand is a king, excluding an ace-high Pai Gow hand), or a queen-high Pai Gow, or a jack-high Pai Gow, or a ten-high Pai Gow hand, etc.), the dealer's hand is reviewed for its best five-card rank. If the dealer's hand falls below or meets this threshold, an enhanced or additional bonus is available to all players that have their own bonus hand. For example, if the threshold dealer hand for the additional bonus is a king-high Pai Gow hand, and the dealer's hand has no flush and consists of jack, ten, nine, seven, five, four, and two the threshold has been met and the player with a ranked bonus hand will have the bonus hand payout increased by means of an additive amount of a multiplier, or both. For further illustration, if the player had a high and low hand of a straight and a pair and had made an initial $10.00 Pai Gow wager and one $1.00 side wager, in this circumstance the player would be paid $10.00 (even money) less house commission (e.g., $0.50) on the Pai Gow poker game wager (assuming a win), would be entitled to $10.00 bonus for having the straight, and because of the dealer's low threshold hand, the $10.00 bonus would be multiplied to $20.00 (assuming two times for the additional bonus effect for the dealer having a low hand). The player would therefore receive his initial $10.00 wager and a return of $30.00 on both games, while losing the $1.00 side wager that is always collected by the house.

This play offers some significant benefits to the player and the house while increasing the potential for enjoyment by the players. First, there are no additional implements needed to add a bonus feature to Pai Gow poker, such as dice or a roulette-type wheel. The game does not allow for any change in strategy in the play of the underlying game. The bonus events may be quickly and easily determined.

Examples

An example of a round of play of a Pai Gow poker game with side wager according to the present invention is described as follows. To simplify the description, only four players (1, 2, 3, and 4) are at the table in areas 23, 24, 25, and 26. The table surface 10 is shown in FIG. 1. Six player hands and a dealer hand are dealt, as with traditional Pai Gow poker, with four residual cards. The jackpot event has been seeded by the casino, with a starting amount of $10,000.00, and is displayed on progressive meter 32 located at the table, by way of non-limiting example. A game controller 34 records the wagers made on electronic wagering sensors 26*a* through 26*d* and increments the meter 32.

In a preferred form of the invention, side wager sensors, such as those described in U.S. Pat. No. 6,299,154, are used to register wagers. The specification of this patent is herein incorporated by reference. Examples of suitable jackpot control hardware are disclosed in U.S. Pat. No. 5,364,104, the content of which is hereby incorporated by reference.

Players 1, 2, 3, and 4 place $5.00 wagers on betting circles 24*a* through 24*d*, in the underlying Pai Gow game. Players 1 and 2 place wagers of $1.00, Player 3 places a wager of $5.00, and Player 4 places no wager, respectively, on areas 26*a*, 26*b*, 26*c*, and 26*d* for the side wager game that includes a progressive wager (with 20% of the minimum bet of $1.00, or $0.20, for event wager contribution to the jackpot amount). From this wager, the initial jackpot amount is increased by $0.20 per player. Player positions 23, 24, 25, and 26 and the dealer's position 28 are dealt seven cards each from a starting deck of fifty-three cards (the standard fifty-two-card playing deck and a joker). Each player and the dealer set their high and low hands and place them in the appropriate hand areas 34*a* through 34*d* and 33. The presence of a bad beat event or envy bet event may or may not be included in this game. The inclusion of these events might be considered in adjusting, probably lowering, the contribution to the jackpot amount from the side wager.

The normal play of Pai Gow poker is undertaken, and the events of that play are immaterial to the play of the side wager. The hands are left on the table. At the conclusion of the Pai Gow game, the dealer reviews or arranges the players seven cards to identify a best five-card poker hand. The dealer may also arrange the dealer cards into a best five-card hand at this time, or the dealer may wait to arrange the dealer's hand. This is an insignificant choice, as the dealer's hand is already fully exposed. The dealer examines the best five-card hands of all players to determine whether any player, entered into the first side wager game against the pay table, has a qualifying hand, i.e., a hand of at least a straight in the example of this game. The dealer's best five-card hand is displayed by the dealer at a central position 33 (e.g., where the dealer's hand had been previously located).

It is assumed, in this example, that the Pai Gow game has been resolved, and the best five-card hands are a three-of-a-kind for Player 1; a straight for Player 2; two pair for Player 3; and a full house for Player 4. In this situation, Player 1, who entered the side wager game against the pay table, gets no bonus payout, the player's hand being below the threshold of a straight. Player 2 has a guaranteed bonus payout of 1:1 on the original Pai Gow wager because of the straight. Player 3, who entered the side wager game, gets no bonus payout, the player's hand being below the threshold of a straight. Player 4 gets no bonus for the full house because no side wager against the pay table was made by Player 4. If there had been an envy wager event included in the event wagers of Players 1, 2, and 3, the players would respectively obtain (Player 1) a payout of 1× the envy payment for a full house, (Player 2) a payout of 1× the envy payment for a full house, and (Player 3) an envy payout of 5× the envy payment for a full house. As understood in the art, the winning envy bonus hands may be the same hands that pay a bonus, a subset of those hands, or even different hands.

The bonus event, in this example of the invention, pays all or a portion of a progressive payout for certain winning hands, plus an odds payout amount for one or more of the same winning hands. An exemplary pay table, below, shows the combinations of payouts possible by practicing an exemplary bonus event of the present invention.

| HAND | PROGRESSIVE | PAYOUT ODDS |
|---|---|---|
| 7-Card Straight Flush | 100% | 1000:1 |
| 5 Aces | 10% | 500:1 |
| Royal Flush | | 200:1 |
| Straight Flush | | 50:1 |
| Four-of-a-Kind | | 25:1 |
| Full House | | 5:1 |
| Flush | | 4:1 |
| Straight/Three-of-a-Kind | | 2:1 |

Because Player 1 placed the side wager of $1.00 and holds a three-of-a-kind, he wins $2.00. Player 2 holds a straight and placed the side wager of $1.00 and wins $2.00. Player 3 placed a side wager of $5.00 and holds two pair and does not win. Player 4 did not place a side wager and does not win on this wager.

All of the apparatus, devices, and methods disclosed and claimed herein can be made and executed without undue experimentation in light of the present disclosure. While the apparatus, devices, and methods of this invention have been described in terms of both generic descriptions and preferred embodiments, it will be apparent to those skilled in the art that variations may be applied to the apparatus, devices, and methods described herein without departing from the concept and scope of the invention. More specifically, it will be apparent that certain elements, components, steps, and sequences that are functionally related to the preferred embodiments may be substituted for the elements, components, steps, and sequences described and/or claimed herein while the same of similar results would be achieved. All such similar substitutions and modifications apparent to those skilled in the art are deemed to be within the scope and concept of the invention as defined by the appended claims.

What is claimed is:

1. A method of operating a table in communication with a game controller operatively connected to a progressive jackpot meter and using at least one physical deck of cards, the table having a surface illustrated at each of a plurality of player positions with a first token area for an underlying event and a second token area for a side event, the method comprising:

operating the table in a round of the method according to a set of rules applied in an ordered combination of steps, the set of rules comprising rules of:

a participant must place a main wager to participate in the round;

the participant may place a side wager to participate in multiple side events;

an amount of the side wager is not limited to a fixed amount or percentage;

the side wager funds the multiple side events; and increasing the amount of the side wager increases the potential payout on the side wager; and the ordered combination of steps comprising:

applying the rule that the participant must place the main wager to participate in the round, comprising receiving, at the first token area and from the participant, at least one token, as the main wager, to initiate administration of the underlying event;

applying the rule that the participant may place the side wager to participate in multiple side events, applying the rule that the amount of the side wager is not limited to the fixed amount or percentage, and applying the rule that the side wager funds the multiple side events, comprising:

receiving, at the second token area and from the participant, at least one additional token forming the amount of the side wager at at least a predefined threshold amount, the amount of the side wager selected by the participant during the round from a predefined set of amounts comprising:

the predefined threshold amount to initiate, in addition to administration of the underlying event, administration of a nonprogressive event, a progressive event, and an envy event; and a predefined minimum to initiate administration of only the nonprogressive event and the progressive event and not the envy event; and a game controller detecting, by an electronic sensor at the second token area, the presence of the at least one additional token; and the game controller incrementing the progressive jackpot meter to increase, by a predetermined portion of the amount of the side wager, a progressive amount displayed by the progressive jackpot meter;

administering the underlying event, comprising:

distributing, from the at least one physical deck of cards, cards for a participant hand; and resolving the underlying event based at least in part on the cards for the participant hand; and applying the rule that increasing the amount of the side wager increases the potential payout on the side wager, comprising:

administering the nonprogressive event, comprising applying a nonprogressive pay table to the cards for the participant hand, the nonprogressive pay table defining nonprogressive payouts of multiples applied to the amount of the side wager;

administering the progressive event, comprising applying a progressive pay table to the cards for the participant hand, the progressive pay table defining at least one hand rank qualifying the participant for a percentage of the progressive amount displayed by the progressive jackpot meter; and administering the envy event comprising applying another pay table to cards of another participant in the round.

2. The method of claim 1, wherein the predetermined portion of the amount of the side wager for incrementing the progressive jackpot meter is a fixed percentage of the amount of the side wager.

3. The method of claim 2, wherein the fixed percentage is at least 5% of the amount of the side wager.

4. The method of claim 2, wherein the fixed percentage is determined based at least in part on the progressive amount displayed by the progressive jackpot meter.

5. The method of claim 1, wherein the predetermined portion of the amount of the side wager for incrementing the progressive jackpot meter is a fixed amount of the amount of the side wager.

6. The method of claim 5, wherein the fixed amount is $1.00, the amount of the side wager being at least $5.00.

7. The method of claim 1, wherein administering the underlying event comprises administering a pai gow event:

wherein distributing, from the at least one physical deck of cards, cards for a participant hand comprises distributing seven cards for the participant hand; and further comprising distributing, from the at least one physical deck of cards, another seven cards for a dealer hand.

8. The method of claim 7, wherein administering the nonprogressive event comprises applying the nonprogressive pay table to the seven cards for the participant hand.

9. The method of claim 8, further comprising, before applying the nonprogressive pay table to the seven cards for the participant hand, forming a highest-ranking five-card participant hand from the seven cards for the participant hand.

10. The method of claim 9, wherein the highest-ranking five-card participant hand has a different card composition than a five-card high hand of the participant from the pai gow event.

11. A method of operating a table with a progressive jackpot meter, the table comprising a surface with an illustrated layout designating a plurality of participant positions each bearing indicia designating a first token area for a main event and a second token area for at least both a nonprogressive side event and a progressive side event, the method comprising:

operating the table in a round of the method according to a set of rules applied in a combined order of steps, the set of rules comprising rules of:

a participant must place a main wager to participate in the round;

the participant may place a side wager to participate in multiple side events;

an amount of the side wager is not limited to a fixed amount or percentage;

the side wager funds the multiple side events; and increasing the amount of the side wager increases the potential payout on the side wager; and the combined order of steps comprising:

applying the rule that the participant must place the main wager to participate in the round, comprising receiving, from the participant in the round, a token in the first token area, as the main wager, to indicate participation in the main event;

applying the rule that the participant may place the side wager to participate in multiple side events, applying the rule that the amount of the side wager is not limited to the fixed amount or percentage, and applying the rule that the side wager funds the multiple side events, comprising:

receiving, from the participant in the round, another token in the second token area, as the side wager, to indicate participation in at least the nonprogressive side event and the progressive side event, the amount of the side wager selected by the participant from a range of side event amounts, wherein the side wager being of at least a predefined threshold amount from the range also indicating participation in at least another side event, the range of side event amounts comprising a predefined minimum not qualifying for the at least another side event; and increasing a progressive amount displayed by the progressive jackpot meter, comprising applying to the progressive amount a predetermined portion of the amount of the side wager;

distributing participant cards and dealer cards from a resource of intermixed playing cards, the intermixed playing cards comprising at least one physical deck of cards;

administering the main event to resolve the main wager in the first token area based at least in part on a rank of the participant cards relative to a rank of the dealer cards; and applying the rule that increasing the amount of the side wager increases the potential payout on the side wager, comprising:

administering the nonprogressive side event, the progressive side event, and the at least another side event to resolve the side wager in the second token area, comprising:

administering the nonprogressive side event, comprising applying a predefined pay table to the participant cards, the predefined pay table defining payouts of multiples applied to the amount of the side wager;

administering the progressive side event, comprising applying a predefined progressive pay table to the participant cards, the predefined progressive pay table defining at least one rank qualifying for the progressive amount displayed by the progressive jackpot meter; and administering the at least another side event based at least in part on a rank of cards of another participant in the round.

12. The method of claim 11, wherein the range of side event amounts has a minimum of $1.00 and a maximum of $5.00.

13. The method of claim 11, wherein the predefined minimum not qualifying for the at least another side event is $1.00.

14. The method of claim 11, wherein the predefined threshold amount indicating participant in at least another side event is greater than $1.00.

15. The method of claim 14, wherein the predefined threshold amount is $5.00.

16. The method of claim 11, wherein the at least another side event comprises an envy event.

17. A method of operating a table and progressive meter using at least one physical deck of cards, the table comprising a surface illustrated to designate a plurality of token areas comprising a main event area and a side event area, the method comprising:

operating the table in a round of the method according to a set of rules applied in a combination of steps, the set of rules comprising rules of:

a participant must place a main wager to participate in the round;

the participant may place a side wager to participate in multiple side events;

an amount of the side wager is not limited to a fixed amount or percentage;

the side wager funds the multiple side events; and increasing the amount of the side wager increases the potential payout on the side wager; and the combination of steps comprising, in the following order:

applying the rule that the participant must place the main wager to participate in the round, applying the rule that the participant may place the side wager to participate in multiple events, and applying the rule that the amount of the side wager is not limited to the fixed amount or percentage, comprising receiving, from the participant, at least one token in the main event area, as the main wager, and at least one other token in the side event area, as the side wager, the amount of the side wager being at least a predefined threshold amount to qualify the participant for an envy event in addition to a nonprogressive side event and a progressive side event;

applying the rule that the side wager funds the multiple side events, comprising incrementing a progressive amount displayed by the progressive meter with a portion of the side wager;

distributing, from an intermixed set of cards from the at least one physical deck of cards, participant cards and dealer cards;

administering a main event to resolve the main wager based at least in part on a comparison of the participant cards to the dealer cards;

applying the rule that increasing the amount of the side wager increases the potential payout on the side wager, comprising administering the nonprogressive side event, the progressive side event, and the envy event to resolve the side wager, comprising:

administering the nonprogressive side event, comprising applying a nonprogressive pay table to the participant cards, the nonprogressive pay table defining nonprogressive payouts of multiples applied to the amount of the side wager;

administering the progressive side event, comprising applying a progressive pay table to the participant cards, the progressive pay table defining at least one rank qualifying for the progressive amount displayed by the progressive meter; and administering the envy event, comprising comparing the participant cards to cards of another participant.

18. The method of claim 17, wherein the predefined threshold amount is greater than a predefined amount for the main wager.

19. The method of claim 18, wherein the predefined threshold amount is $5.00 and the predefined amount for the main wager is $1.00.

* * * * *